Feb. 23, 1937.  O. C. W. HENZE ET AL  2,071,338
ILLUSION PORTRAIT MOUNT AND COMPACT FOR FASHION ANTICIPATION
Filed Nov. 2, 1932
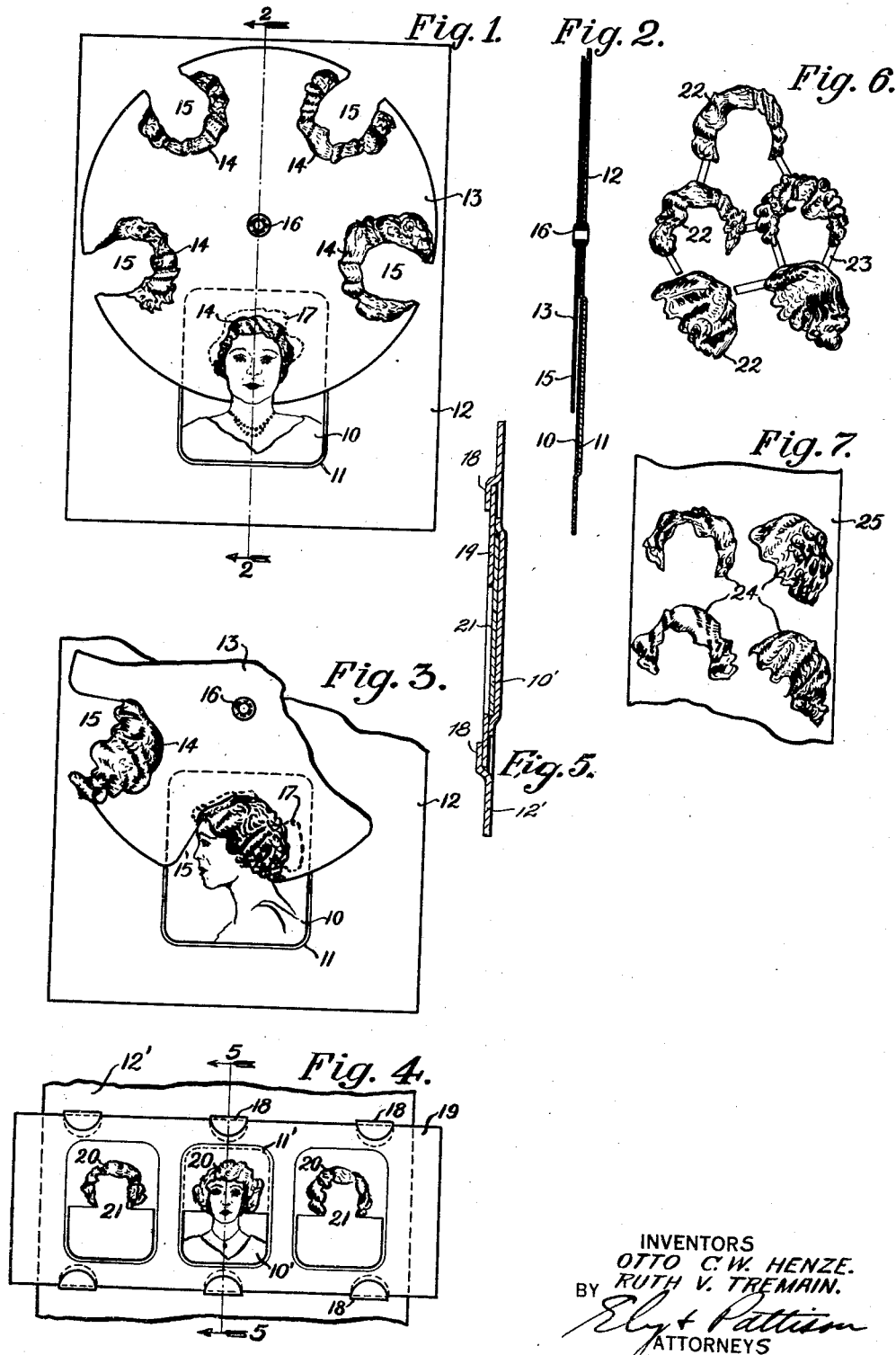
INVENTORS
OTTO C. W. HENZE.
BY RUTH V. TREMAIN.
ATTORNEYS Patented Feb. 23, 1937

2,071,338

UNITED STATES PATENT OFFICE 2,071,338

ILLUSION PORTRAIT MOUNT AND COMPACT FOR FASHION ANTICIPATION

Otto C. W. Henze, Brooklyn, and Ruth V. Tremain, New York, N. Y.; said Tremain assignor to said Henze Application November 2, 1932, Serial No. 640,751

4 Claims. (Cl. 35—59)

This invention relates to improvements in illusion devices.

One of the objects of the invention is to provide an illusion and advertising means by which a person may anticipate which fashion of hair dress or the like is most becoming, and which is accomplished by varying the combination of a portrait picture of the user with one or more complementary composite hair style fashion representations, or by the superposition of complementary composite fashion representations to be positioned over portrait pictures.

Another feature of the invention is to provide a fixed picture image of the individual, and a movable mask member having incurvate facial cut outs and various fashions or styles of hair dresses arranged around and about the respective cut outs whereby any selected style of hair dress may be brought into position relative to the picture image and impart an illusion that the hair dress is an actual part of the portrait. By this means, various styles of coiffure may be matched with the facial features of the portrait of an individual.

With these and other objects in view, the invention resides in the novel construction, combination and arrangement of parts, the essential features of which are hereinafter fully described, are particularly pointed out in the appended claims, and are illustrated in the accompanying drawing, in which:—

Figure 1 is a front elevational view of the preferred embodiment of the invention, Figure 2 is a vertical sectional view on the line 2—2 of Figure 1, Figure 3 is a fragmentary front elevational view, but showing the device for obtaining a profile illusion, Figure 4 is a front elevational view of a modified form, Figure 5 is a vertical transverse sectional view on the line 5—5 of Figure 4, Figure 6 is a front elevational view of a further modification, Figure 7 is a front elevational view of a still further modification.

Referring to the drawing by reference characters, the numeral 10 designates a picture in the form of a portrait of the subject or particular person and which is of a suitable size to fit into the indentation or countersink 11 formed in a flat body, card, or picture mount 12. The portrait for the purposes of illustration has been shown as depicting the head and shoulders of the individual, although a full length picture may be used if desired. In Figure 1 of the drawing, a front view of the individual is shown whereas in Figure 3 a picture of the individual has been shown in profile, but the illusion effect is identical in the use of both pictures as will be hereinafter appreciated.

Rotatably supported upon the body or mount 12 and overlying the portrait is a disk or circular mask member 13 having different fashion styles 14 represented on the outside thereof and arranged in spaced radial relation. The disk or mask member is provided with marginate incurvate cut outs 15 which open onto the edges of the disk and are of a size and shape to expose the facial characteristics of the portrait 10 when the marginate cut outs are brought into proper alinement with the head portion of the portrait. The fashion styles 14 are represented adjacent to the marginate cut outs to appear as part of the portrait when properly positioned.

The disk or mask member 13 is rotatably mounted upon an eyelet or like pivot 16 which passes through the mount 12.

From the foregoing description, it will be seen that upon rotation of the disk or mask member 13, any selected fashion representation 14 may be brought into association with the portrait 10. When properly adjusted, only the original depicted hair style 17 of the portrait 10 will be masked out and the facial features of the head of the portrait will be visible. The complementary fashion representation 14 will appear as part of the portrait 10, thus producing the desired illusion and anticipation effect.

In Figures 4 and 5 of the drawing, we have shown a modified form wherein the mounting or body 12' is constructed of sheet metal, card board, or other like stiff material from which sets of opposed tongues 18 are cut and bent. The tongues 18 extend inwardly and provide a means for slidably supporting mask member 19. The slidable mask member 19 is provided with marginate cut out openings 21 adjacent which different styles of hair dress 20 are represented. The picturization or photograph 10' is set in the indentation or counter sink 11' formed in the body 12' similar to the construction shown in Figures 1 to 3 inclusive. By sliding the mask member 19, any selected hair style 20 may be brought into association with the portrait 10' and the result is the same as that produced by the preferred form.

In Figure 6 of the drawing, there is illustrated a further modification in which the fashion or style representation 22 is trimmed and stamped out of bendable material, and if desired, certain of its components may be joined by tabs 23. The tabs connecting the components may be broken or severed and bent back about a portrait head of the subject, or the component may be superposed and pasted to the portrait for anticipating the appearance.

In Figure 7 of the drawing, the illusion components 24 are printed upon a sheet 25 and may be cut out and fitted to portraits of the subject, and the same illusion will result as hereinbefore described.

While we have shown and described what we deem to be the most desirable embodiment of our invention, we wish it to be understood that various changes in sizes, materials, and shape may be made as come within the scope of the appended claims without in any way departing from the spirit of the invention.

Having thus described the invention, what we claim as new and desire to secure by Letters Patent of the United States, is:—

1. An illusion portrait mount or compact comprising a fixed portrait of a person, a mask element movable relative to said portrait, said mask element having marginate incurvate facial cut outs for selective superposition over the head portion of said portrait, and various fashion styles of head dress provided on said mask element adjacent to said marginate cut outs.

2. A device for enabling a person to anticipate one's appearance with various fashion styles of head dress comprising a mount, a portrait supported by said mount, a mask element movably supported upon said mount in superposed relation to said portrait, said mask element being provided with individual cut outs of a shape to reveal the facial features of the head of the portrait and conceal all other portions thereof when any of said cut outs are brought into alinement with said portrait, and various fashion styles of head dress provided on the outer side of said mask element adjacent said cut outs, whereby said mask element may be moved to aline any selected cut out with the head of the portrait and produce a composite portrait.

3. A device for enabling a person to anticipate one's personal appearance with various fashion styles of hair dress comprising a flat mount, a marked area provided on the front side of said mount for correctly positioning one's portrait thereon, a portrait positioned upon said mount within said marked area, a flat mask element movably supported upon said mount and superposed relative to said marked area, a series of cut outs provided in said mask element and being of a shape to expose the facial features of the portrait when brought into selective registration therewith while the mask element conceals the hair of said portrait, and different hair style representations provided on the outer side of said mask element and extending inwardly from the edges of said cut outs whereby the different hair style representations may be brought into composite relation with respect to the exposed facial features of said portrait when the cut outs are respectively brought into proper registration with said portrait.

4. A device for enabling a person to anticipate one's personal appearance with various fashion styles of hair dress comprising a flat mount having a recess on the front side thereof, a portrait seated in said recess and disposed flush with or below the front flat surface of said mount, a mask element movably mounted upon the front side of said mount and superposed relative to said recess, said mask element provided with cut outs for successive registration with said portrait to reveal the facial features thereof while the mask element conceals the hair thereof, and various hair style pictures extending inwardly from the edges of the cut outs on the outer side of said mask element for merging relation with the exposed facial features of said portrait when the cut outs are brought into proper register with said portraits.

OTTO C. W. HENZE.
RUTH V. TREMAIN.